United States Patent [19]

Isobe et al.

[11] Patent Number: 4,591,770
[45] Date of Patent: May 27, 1986

[54] NUMERICAL CONTROLLER

[75] Inventors: Shinichi Isobe; Kazuo Sawada, both of Hino, Japan

[73] Assignee: Fanuc Ltd., Tokyo, Japan

[21] Appl. No.: 642,665

[22] PCT Filed: Dec. 13, 1983

[86] PCT No.: PCT/JP83/00434
§ 371 Date: Aug. 15, 1984
§ 102(e) Date: Aug. 15, 1984

[87] PCT Pub. No.: WO84/02593
PCT Pub. Date: Jul. 5, 1984

[30] Foreign Application Priority Data

Dec. 20, 1982 [JP] Japan .................. 57-223372

[51] Int. Cl.$^4$ ............................................. G05B 23/02
[52] U.S. Cl. .................................... 318/565; 364/184; 340/680
[58] Field of Search .................. 318/563, 565, 603; 364/184; 340/679, 680

[56] References Cited

U.S. PATENT DOCUMENTS 3,500,023  3/1970  Arrowood et al. ............. 318/563 X
3,778,696  11/1973  Walters et al. ..................... 318/565
4,479,177  10/1984  Berti .................................. 318/563 X
4,480,303  10/1984  Takada et al. ................... 318/565 X

FOREIGN PATENT DOCUMENTS 49-68193  7/1974  Japan ........................................ 54/55
57-11687  1/1982  Japan ........................................ 69/36

Primary Examiner—B. Dobeck
Attorney, Agent, or Firm—Staas & Halsey

[57] ABSTRACT

The present invention is to increase the reliability of a numerical controller by permitting the detection of an abnormality in a position sensing pulse which is output each time a moving part moves by a fixed amount.

A position sensor (6) outputs a reference position sensing pulse each time a moving part reaches a predetermined position, and a direction discriminating circuit (7) outputs a position sensing pulse each time the moving part moves by a fixed amount. A reversible counter (8) counts the position sensing pulse from the direction discriminating circuit (7), and abnormality detecting circuits (9) and (10) detect an abnormality in the position sensing pulse on the basis of the count value of the reversible counter (8) and the generating timing of generation of the reference position sensing pulse. Accordingly, it is possible to detect abnormalities in the position sensing pulse which causes erroneous operations such as runaway of a motor and a discrepancy between a commanded position and the actual position of the moving part.

2 Claims, 1 Drawing Figure

NUMERICAL CONTROLLER

BACKGROUND OF THE INVENTION

The present invention relates to improvement in a numerical controller, and more particularly to a numerical controller of improved reliability which is designed to be capable of detecting abnormalities in position sensing pulses from a position sensor.

A numerical controller generally includes a position feedback loop which drives a motor so that the difference between the number of command pulses and the number of position sensing pulses from a position sensor is reduced to zero, and causes each moving part, such as the rotary shaft of the motor or a feed table, to move to a position corresponding to the number of command pulses at a speed corresponding to the frequency of the command pulses. Accordingly, there has been such a defect that when abnormalities, such as a dropout of a pulse and mixture of noise, occur in the position sensing pulses, the moving part cannot be moved to a predetermined position. For this reason, there has been demanded a numerical controller of enhanced reliability which is adapted to be capable of detecting abnormalities in the position sensing pulses from the position sensor.

SUMMARY OF THE INVENTION

The present invention is intended to meet the above-said demand, and has for its object to permit the detection of abnormalities in the position sensing pulses, thereby providing for improved reliability in the numerical controller.

The present invention is provided with a counter for counting position sensing pulses which are each output from position sensing means each time a moving mechanical part moves by a fixed amount, and abnormality detecting means for detecting an abnormality in the position sensing pulses on the basis of the generation timing of a reference position sensing pulse which is output from the position sensing means upon each arrival of the moving mechanical part at a predetermined position and the count value of the counter. Since it is possible to detect abnormalities in the position sensing pulses which will cause erroneous operations such as a deviation of the actual position of the moving mechanical part a commanded position and a runaway of the motor, the reliability of the controller can be increased.

DETAILED DESCRIPTION OF THE PREFERRED EMBODIMENT

Figure 1:
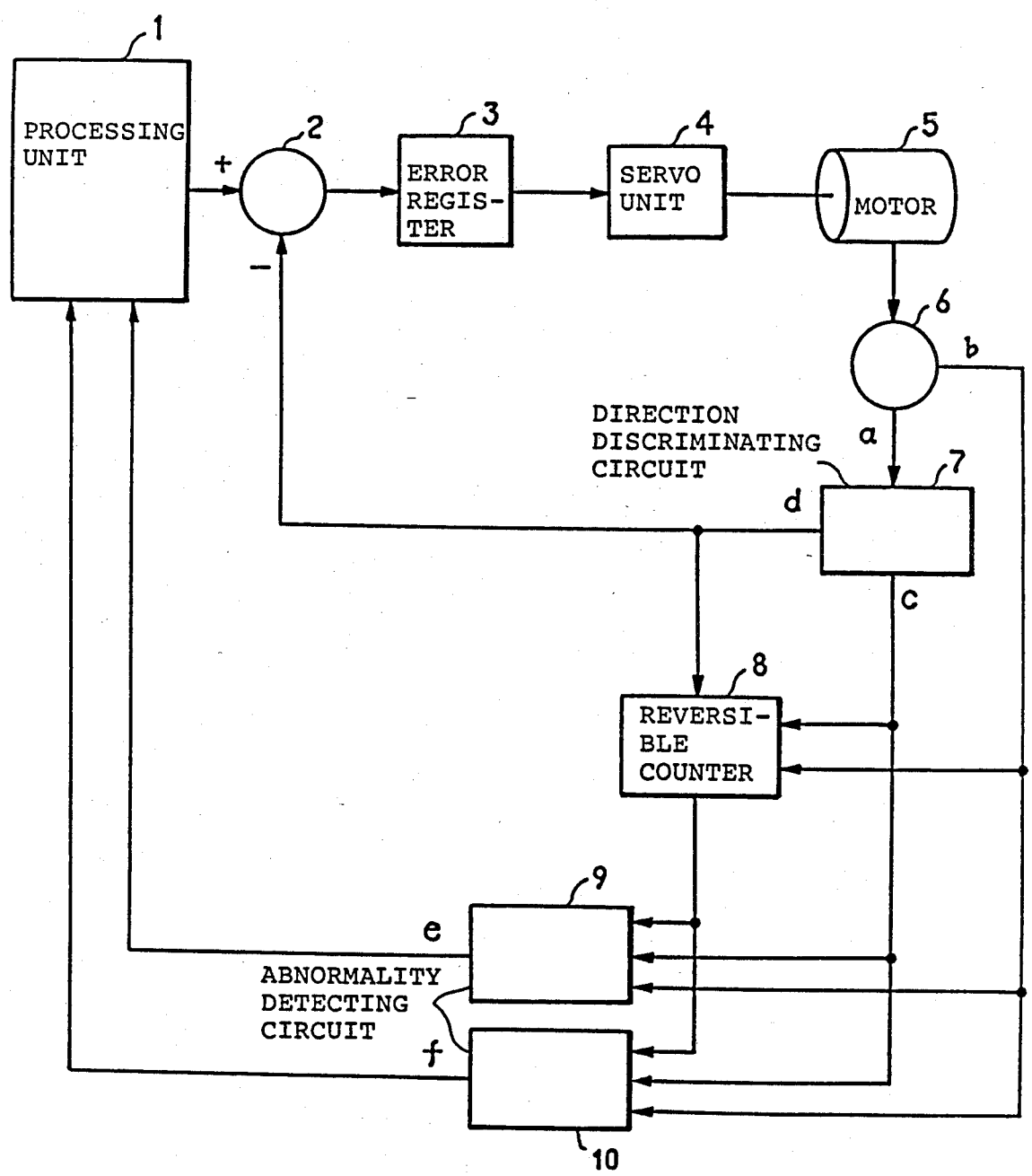
FIG. 1 is a block diagram of an embodiment of the present invention.

FIG. 1 is a block diagram of an embodiment of the present invention, and 1 is a processing unit constituted as by a microprocessor, 2 an adder, 3 an error register, 4 a servo unit, 5 a motor, 6 a position sensor which outputs a two-phase pulse (a) each time the motor rotates through a fixed angle, and outputs a reference position sensing pulse (b) each time the rotational angular position of the motor 5 reaches a predetermined position, 7 a direction discriminating circuit which detects the direction of rotation of the motor 5 on the basis of the phase relation of the two-phase pulse a, outputs a signal c indicating the direction of rotation and outputs a position sensing pulse d each time it detects, on the basis of the two-phase pulse a, that the motor 5 has rotated through a fixed angle, 8 a reversible counter, and 9 and 10 abnormality detecting circuits. Incidentally, the direction discriminating circuit 7 produces, as its output signal c, a "1" during forward rotation of the motor 5 and a "0" during backward rotation.

The error register 3 supplies the servo unit 4 with a signal for driving the motor 5 in such a manner that the difference between the number of command pulses from the processing unit 1 and the number of position sensing pulses d from the direction discriminating circuit 7 is reduced to zero. By the output of the servo unit 4, the motor 5 is driven through an angle corresponding to the number of command pulses at a speed corresponding to the frequency of the command pulses. Incidentally, since the above-described operation is already well known, no detailed description will be given thereof.

The reversible counter 8 is initialized to a count value "0" by the reference position sensing pulse b which is output from the position sensor 6 for the first time after the power is turned on. Then, when the signal c indicating the direction of rotation of the motor 5 is a "1", the reversible counter counts upward, 1, 2, 3, . . . , upon each application thereto of the position sensing pulse d. When the count value reaches a value (N−1) one short of the number of position sensing pulses d (hereinafter represented by N) which are provided from the direction discriminating circuit 7 during one rotation of the motor 5, the count value is made a "0" by the next position sensing pulse, after which the reversible counter similarly counts upward again upon each application of the position sensing pulse d. In the event that the signal c is a "0", the reversible counter counts downward, (N−1), (N−2), . . . , upon each application of the position sensing pulse d. When the count value reaches a "1", the count value is made "N−1" by the next position sensing pulse d, after which the reversible counter similarly counts downward again upon each application of the position sensing pulse d.

In the count value of the reversible counter 8, a region is set which includes a "0" and has a fixed permissible range on either side thereof, and this region will hereinafter be called a reference position sensing pulse expectation region (hereinafter referred to simply as the expectation region). If the position sensing pulse d and the reference position sensing pulse b are both free from such abnormalities as a dropout of a pulse and the mixture of noise, then the reference position sensing pulse b will be produced whenever the count value of the reversible counter 8 passes through the expectation region, and there is no possibility of the reference position sensing pulse b being generated outside the expectation region.

When supplied with the reference position sensing pulse b from the position sensor 6, the abnormality detecting cirtuit 9 inputs thereinto the count value of the reversible counter 8 at that time, and if the count value is outside the expectation region, then it will decide that such an abnormality as a dropout of a pulse or mixture of noise exists in the position sensing pulse d or reference position sensing pulse b, and will yield a "1" as its output signal e, notifying the processing unit 1 of the detection of abnormality.

The abnormality detecting circuit 10 is a circuit that detects that the count value of the reversible counter 8 has passed through the expectation region, and checks whether the reference position sensing pulse has been generated during the passage of the count value through the expectation region. If the reference position sensing pulse b has not been produced even once although the count value of the reversible counter 8 passed through the expectation region, then this abnormality detecting circuit will decide that the position sensing pulse d or reference position sensing pulse b is abnormal, and will yield a "1" as its output signal f, notifying the processing unit 1 of the detection of abnormality.

When at least one of the output signals e and f of the abnormality detecting circuits 9 and 10 is a "1", the processing unit 1 will conduct such a process as the generation of an alarm signal or cutting off excitation of the motor 5.

While the embodiment has been described in connection with the case of using a position sensor for sensing the rotational angular position of the motor, it is matter of course that the present invention is not limited specifically thereto but may also be applied to the case of using a scale type position sensor which is mounted directly on a feed table or the like.

As has been described in the foregoing, the present invention is equipped with a counter (the reversible counter 8 in the embodiment) for counting position sensing pulses from position sensing means (which comprises the position sensor 6 and the direction discriminating circuit 7 in the embodiment) and abnormality detecting means (which comprises the abnormality detecting circuits 9 and 10 in the embodiment) for detecting abnormality in the position sensing pulse on the basis of the count value of the counter and the generating timing of a reference position sensing pulse from the position sensing means. The present invention permits the detection of abnormalities in the position sensing pulse which lead to faulty operations such as a discrepancy between a commanded position and the actual one and runaway of the motor, and hence possesses the advantage of improving the reliability of the numerical controller.

We claim:

1. A numerical controller for moving a moving part, comprising:

position sensing means for providing a position sensing pulse each time a moving part moves by a fixed amount, and for providing a reference position sensing pulse each time the moving part reaches a predetermined position;

counter means for counting the position sensing pulse; and abnormality detecting means for detecting an abnormalty in the position sensing pulse on the basis of the count value of the counter and the timing of generation of the reference position sensing pulse.

2. A numerical controller according to claim 1, wherein the abnormality detecting means comprises:

signal means, operatively connected to the counter means and to receive the reference position sensing pulse, for providing in response to receiving the reference position sensing pulse a first abnormality signal when the count value is outside an expected region, and for providing a second abnormality signal when the count value is within the expected region and the reference position sensing pulse has not been received.

* * * * *